(12) United States Patent
Gunnarsson et al.

(10) Patent No.: US 8,190,297 B2
(45) Date of Patent: May 29, 2012

(54) CONTROL METHOD AND SYSTEM FOR A FLUID CONTROL DEVICE, BASED ON POSITION SENSOR LEARNING

(75) Inventors: Andreas Gunnarsson, Södertälje (SE); Simone Barbero, Turin (IT); Ronnie Magnusson, Vargön (SE); Nando Vennettilli, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 386 days.

(21) Appl. No.: 12/496,901

(22) Filed: Jul. 2, 2009
(Under 37 CFR 1.47)

(65) Prior Publication Data

US 2010/0094469 A1    Apr. 15, 2010

(30) Foreign Application Priority Data

Jul. 3, 2008    (GB) .................................. 0812152.7

(51) Int. Cl.
*G05D 7/00*    (2006.01)
(52) U.S. Cl. .......... 700/282; 700/302; 702/94; 702/104; 415/148
(58) Field of Classification Search .................. 700/282, 700/302; 702/94, 104
See application file for complete search history.

(56) References Cited

U.S. PATENT DOCUMENTS

| | | | |
|---|---|---|---|
| 4,761,608 A * | 8/1988 | Franklin et al. ................ | 324/202 |
| 5,157,956 A * | 10/1992 | Isaji et al. ...................... | 73/1.75 |
| 6,543,227 B2 | 4/2003 | He et al. | |
| 7,137,252 B2 * | 11/2006 | Ando et al. ...................... | 60/602 |
| 7,426,829 B2 * | 9/2008 | Greentree ........................ | 60/602 |
| 7,855,525 B2 * | 12/2010 | Sanders et al. ................ | 318/466 |
| 2003/0145591 A1 | 8/2003 | Arnold | |
| 2004/0000143 A1 | 1/2004 | Ahmad | |
| 2006/0257237 A1 | 11/2006 | McDonald et al. | |
| 2008/0295513 A1 * | 12/2008 | Rollinger et al. ............... | 60/602 |
| 2009/0123272 A1 * | 5/2009 | Love et al. ...................... | 415/148 |
| 2009/0299673 A1 * | 12/2009 | Padhye et al. ................. | 702/100 |
| 2009/0301083 A1 * | 12/2009 | Rayner et al. ................... | 60/602 |
| 2010/0119355 A1 * | 5/2010 | Cox ................................ | 415/15 |

FOREIGN PATENT DOCUMENTS

| | | |
|---|---|---|
| DE | 19822857 C1 | 7/1999 |
| JP | 10331651 A | 12/1998 |

OTHER PUBLICATIONS

British Patent Office, British Search Report for Application No. 0812152.7, dated Sep. 12, 2008.

* cited by examiner

*Primary Examiner* — Ryan Jarrett
(74) *Attorney, Agent, or Firm* — Ingrassia Fisher & Lorenz, P.C.

(57) ABSTRACT

A control method is provided for a fluid control device, particularly for an internal combustion engine, equipped with a position sensor having a nominal characteristic curve representative of a predetermined relationship between an admissible range of position values and a corresponding range of return electric signal values. The method includes, but is not limited to determining an offset ($offset_{open}$; $offset_{close}$) between a returned signal related to at least one defined position of the device and an expected signal related to the defined position of the device according to the nominal characteristic curve, estimating an updated characteristic curve of the sensor by applying the offset ($offset_{open}$; $offset_{close}$) to the nominal characteristic curve, and applying a predetermined control strategy of the fluid control device according to the updated characteristic curve.

14 Claims, 2 Drawing Sheets

CONTROL METHOD AND SYSTEM FOR A FLUID CONTROL DEVICE, BASED ON POSITION SENSOR LEARNING

CROSS-REFERENCE TO RELATED APPLICATION

This application claims priority to British Patent Application No. 0812152.7, filed Jul. 3, 2008, which is incorporated herein by reference in its entirety.

TECHNICAL FIELD

The present invention relates to the control of the operating position of a fluid control device, particularly a variable geometry turbocharger, in an internal combustion engine for a motor-vehicle, and specifically the control of the operating position of a fluid control device with an operating characteristic different from the nominal one. More particularly the invention relates to a learning method for a position sensor of a fluid control device adapted to take multiple operating positions, the sensor including transducer means adapted to convert a physical entity value indicative of a position of the device into an electrical parameter value, and a detector of the electrical parameter adapted to output an electrical signal representative of the position. The sensor has a nominal characteristic curve representative of a predetermined relationship between an admissible range of values of the physical entity and a corresponding range of return values of the electric signal.

BACKGROUND

When a sensor ages during the life cycle of the device with which it is associated, its accuracy can be lowered and the return value can include an offset when compared with a nominal characteristic curve. In the specific case of a position sensor which is typically used in a variable geometry turbocharger (VGT) for an internal combustion engine (particularly a diesel engine) for a motor-vehicle, the nominal characteristic curve is a straight line. Alteration of the characteristic curve caused by ageing of the sensor or due to manufacturing tolerances may result in an invariable offset throughout the whole operating range (i.e., the range of measured values), thus simply causing a translation of the characteristic curve to an actual curve parallel to the nominal one, or in a variable offset throughout the operating range, thus determining an actual characteristic curve having a different slope from the nominal one.

In a control system for the fluid control device, whose strategy is based on a closed loop control along with a feedforward control, both operating according to the values returned by the sensor, a characteristic curve for the sensor which is different from the nominal one due to an offset of the sensor causes a lowered response time in the system.

It is at least one object of the present invention to minimize the impact of an offset of a position sensor due to ageing or manufacturing tolerances on a control system for a fluid control device in an internal combustion engine, so that the performance of the control is not lowered. In addition, other objects, desirable features, and characteristics will become apparent from the subsequent summary and detailed description, and the appended claims, taken in conjunction with the accompanying drawings and this background.

SUMMARY

A control system arranged for performing the control method according to an embodiment of the invention and a variable geometry turbocharger for an internal combustion engine equipped with such a control system.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
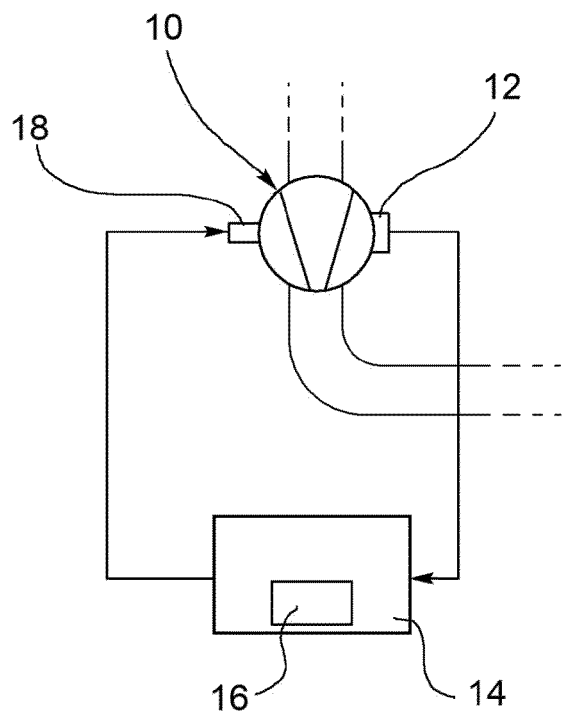
FIG. 1 is a block diagram of a control system for a variable geometry turbocharger for an internal combustion engine, particularly a diesel engine.

With reference to FIG. 1 a control system for a fluid control device, particularly for an internal combustion engine, is briefly described. In an exemplary embodiment of a fluid control device a variable geometry turbocharger (VGT) 10 is herein considered. A variable geometry turbocharger has adjustable deflector blades adapted to take a plurality of operating positions for altering continuously the gap through which the exhaust gas flows in order to reach a turbine of the turbocharger, so as to control the rate of gas flow through the turbine.

The control system includes a position sensor 12 (e.g., a blade angle position sensor), arranged for continuously detecting the operating position of the variable turbine geometry of the turbocharger 10. The sensor 12 includes a transducer portion adapted to convert a physical entity value indicative of an angle position of the deflector blades into an electrical parameter value, and a detecting portion for detecting the electrical parameter value and return an electrical signal representative of the deflector blade angle.

The sensor has a nominal characteristic curve representative of a predetermined relationship between a range of values of the physical entity and a corresponding range of return values of the electric signal. In the example shown the sensor has a straight line characteristic curve relating the deflector blade angle to an output voltage signal.

An electronic control unit 14 including a memory module (e.g., an adaptable non volatile memory) 16 for storing the nominal characteristic curve of sensor 12 is arranged for reading the voltage signal output by the sensor and applying an actuating signal based on the measured position for feeding an actuator 18 (e.g., a pneumatic actuator or an electric motor) and adjusting the deflector blade angle, and thus the turbocharger pressure, to the optimum setting in response to a range of input variable (e.g., as a function of the current engine speed).

The signal to the actuator of the variable geometry turbocharger 10 is typically determined according to a closed-loop PID position controller, whose value is added to a feed forward value, whose result is the unconstricted control signal to the VGT actuator.

A position sensor learning method for a control system according to an embodiment of the invention is described with reference to FIG. 2a, FIG. 2b, and FIG. 2c.

Figure 2A:
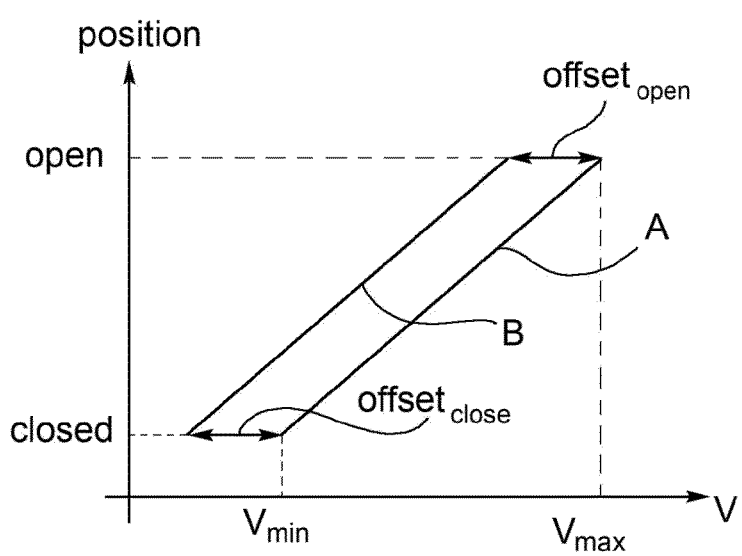
FIG. 2a to FIG. 2c are graphs showing examples of modification of a nominal characteristic curve of a position sensor of the variable geometry turbocharger of FIG. 1.
Figure 2B:
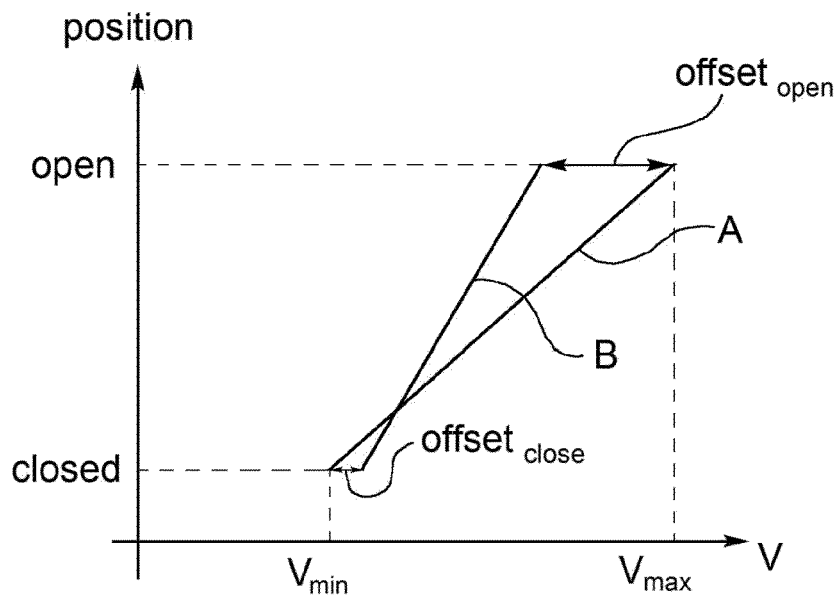

FIG. 2a and FIG. 2b show a first and a second example, respectively, of a nominal characteristic curve A of the sensor 12 and an actual characteristic curve B due to sensor ageing or to manufacturing tolerances. On the vertical axis are depicted the position values of the device as a function of an output voltage signal on the horizontal axis given by the position sensor associated with the device. In the exemplary embodiment of a variable geometry turbocharger (VGT) the position range is comprised between the well defined fully closed and the fully open position of the VGT, while the output voltage signals Vmin and Vmax are the signals returned by the sensor corresponding to the above defined positions of the VGT according to its nominal characteristic curve.

The characteristic curve of the sensor is generally considered to be a straight line and it is assumed that drifts due to sensor ageing or manufacturing tolerances do not modify the linearity of the relationship.

In FIG. 2a a simple translation of the nominal curve is assumed due to ageing or manufacturing tolerances, while in FIG. 2b a translation and tilt of the nominal curve is assumed.

Figure 2C:
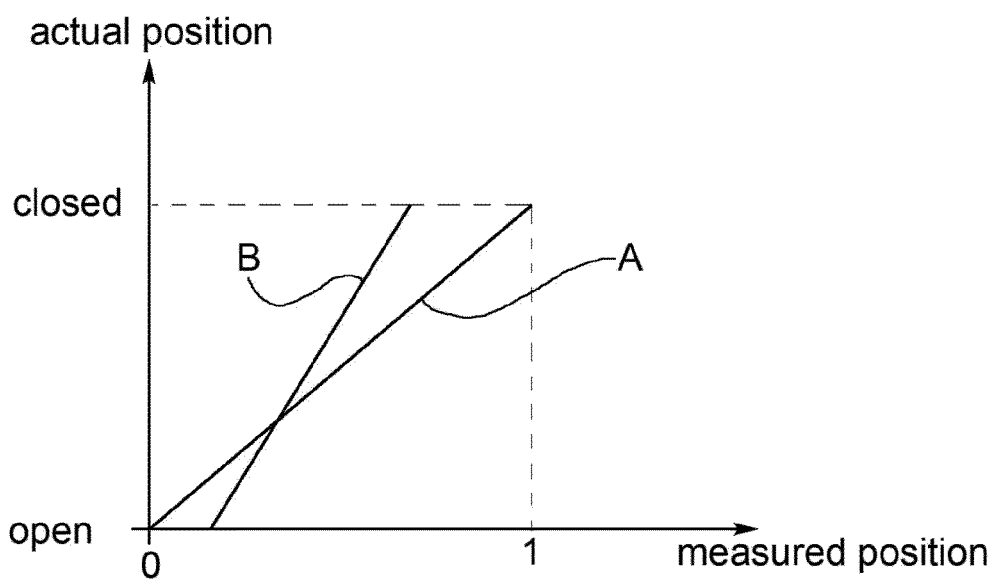

FIG. 2c depicts the actual position values as a function of the measured position values where the nominal characteristic curve of the sensor applies (curve A) or a modified characteristic curve applies (curve B).

According to an embodiment of the invention, by knowing that the sensor should return 0 in the fully open position and 1 in the fully closed position, the offset in at least one of these points, and preferably in both these points, is calculated by subtracting the measured position by 1 in the fully closed position (offset$_{close}$) and only considering the measured value in the fully open position (offset$_{open}$).

When only one defined position is measured, the offset in only one point of the nominal characteristic curve is known and a line parallel to the nominal curve can be drawn which represents an estimation of the offset for all other positions.

When two defined positions are measured (e.g., but not limited to the extreme positions of the operating range), the offsets in two points of the nominal characteristic curve are known and an interpolation line can be applied to intersect both the points which represents an estimation of the offset for all intermediate positions. The straight line can be described by a gain (k) and an offset (m) applied to the measured position and the following equation results:

$$\text{position}_{actual} = \text{position}_{meas} + \text{offset}(\text{position}_{meas}) \qquad \text{a.}$$

$$= \text{position}_{meas} + k * \text{position}_{meas} + m \qquad \text{i.}$$

$$= (1+k) * \text{position}_{meas} + m \qquad \text{b.}$$

More generally, at least two returned electrical signals related to a corresponding number of different defined positions of the VGT may be considered and an updated characteristic curve of the sensor is estimated by curve-fitting the values of the returned signals.

As already pointed out above, in general the defined positions need not be the extremes of the travel of the fluid control device. In fact, the embodiments of the present invention may be applied also to the control of fluid control devices in an internal combustion engine for a motor-vehicle other than a VGT, such as an EGR valve or a throttle valve. While in the application to the control of the blade angle position in a VGT both the end-of-travel positions (i.e., fully open and fully close) are robust, in application to the control of an EGR valve the actual end-of-travel of the valve on the opening side is never reached in order not to damage the valve, and an intermediate defined position is alternatively chosen.

Position learning should only be done without influencing comfort or emissions. Therefore the closed position is preferably learned in an engine idle state and the open position is preferably learnt in an engine after-run state. Idle state is detected when the engine speed stays within a predetermined range for a determined time. After-run state is identified by that the key is turned off and that the engine is not running or cranking.

Moreover, given that idle state or after-run state have been identified, a mean value for the position sensor is calculated by starting a timer for stabilization of the close, respectively open position. When the timer has passed a predetermined stabilization time the learning phase starts. A time is also defined during which measurements of the VGT position shall be performed. An average offset is estimated by filtering a plurality of measured position data related to the same defined position of the device and calculating a mean value of the data. An updated characteristic curve is then estimated by applying the average offset to the nominal characteristic curve.

Conveniently, an updated characteristic curve for a position sensor is applied by the control system of the device in a driving condition at a time in which the driver cannot notice it (e.g., when releasing the accelerator pedal, or at a new starting of the engine).

Advantageously, by applying a method according to an embodiment of the invention, a control system for a fluid control device such as a VGT actuator is able to take into account the offset values of the sensor in the control method (e.g., those offsets due to ageing or manufacturing tolerances of the sensor), so as to perform a faster and more effective control without losing in response performances of the whole system.

Where the principle of the invention remains the same, the embodiments and the details thereof can be varied considerably from what has been described and illustrated purely by way of non-limiting example, without departing from the scope of protection of the present invention as defined by the attached claims. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A control method of a fluid control device for an internal combustion engine, adapted to take a plurality of operating positions and equipped with a position sensor comprising a transducer adapted to convert a physical entity value that is indicative of a position of the fluid control device into an electrical parameter, and a detector of said electrical parameter that is adapted to output an electrical signal that is representative of said position, the position sensor having a nominal characteristic curve (A) representative of a predetermined relationship between an admissible range of said physical entity value and a corresponding range of return values of said electrical signal, the control method comprises the steps of:

storing said nominal characteristic curve;

acquiring at least a first returned electrical signal related to at least one defined position of the fluid control device in an engine idle state, and a second returned electrical signal related to at least one defined position of the fluid control device in an engine after-run state;

determining an offset between said first or second returned electrical signal and an expected signal related to a defined position of the fluid control device according to the nominal characteristic curve;

estimating an updated characteristic curve of the position sensor by applying said offset to the nominal characteristic curve; and applying a predetermined control strategy of the fluid control device according to the updated characteristic curve.

2. A control method according to claim 1, further comprising the steps of estimating an updated characteristic curve of the position sensor by curve-fitting the values of at least the at least first and second returned electrical signals.

3. A control method according to claim 1, further comprising the steps of estimating an updated linear characteristic curve of the position sensor by interpolating the values of at least the first and second returned electrical signals.

4. A control method according to claim 1, further comprising the steps of estimating an updated linear characteristic curve of the position sensor by interpolating the values of at least the first and second returned electrical signals, wherein said updated characteristic curve is described by a gain and the offset.

5. A control method according to claim 1, further comprising the step of estimating an updated characteristic curve periodically according to predetermined learning rate and a condition.

6. A control method according to claim 1, further comprising detecting the engine is in an idle state prior to acquiring the a first returned electrical signal.

7. A control method according to claim 6, wherein detecting the engine is in an idle state further comprise determining when an engine speed remains within a predetermined range for a determined time.

8. A control method according to claim 1, further comprising detecting the engine is an after-run state prior to acquiring the second returned electrical signal.

9. A control method according to claim 8, wherein detecting the engine is an after-run state comprises determining that a key is turned off and that an engine is not running or cranking.

10. A control method of a fluid control device for an internal combustion engine, adapted to take a plurality of operating positions and equipped with a position sensor comprising a transducer adapted to convert a physical entity value that is indicative of a position of the fluid control device into an electrical parameter, and a detector of said electrical parameter that is adapted to output an electrical signal that is representative of said position, the position sensor having a nominal characteristic curve (A) representative of a predetermined relationship between an admissible range of said physical entity value and a corresponding range of return values of said electrical signal, the control method comprises the steps of:

storing said nominal characteristic curve;

acquiring at least a first returned electrical signal related to at least one defined position of the fluid control device;

determining an offset between said first returned electrical signal and an expected signal related to a defined position of the fluid control device according to the nominal characteristic curve;

estimating an updated characteristic curve by applying an average offset to the nominal characteristic curve, the average offset being calculated by filtering a plurality of offset values related to the defined position of the fluid control device and calculating a mean value of the offset values; and applying a predetermined control strategy of the fluid control device according to the updated characteristic curve.

11. A control system for a fluid control device of an internal combustion engine, comprising:

a position sensor comprising a transducer adapted to convert a physical entity value that is indicative of a position of the fluid control device into an electrical parameter, the position sensor having a nominal characteristic curve that is representative of a predetermined relationship between a range of values of said physical entity value and a corresponding range of return values of an electric signal;

a detector of the electrical parameter adapted to return an electrical signal that is representative of said position; and an electronic processor adapted to:

store said nominal characteristic curve;

acquire at least a first returned electrical signal related to at least one defined position of the fluid control device in an engine idle state, and a second returned electrical signal related to at least one defined position of the fluid control device in an engine after-run state;

determine an offset between said first or second returned electrical signal and an expected signal related to a defined position of the fluid control device according to the nominal characteristic curve;

estimate an updated characteristic curve of the position sensor by applying said offset to the nominal characteristic curve; and apply a predetermined control strategy of the fluid control device according to the updated characteristic curve.

12. A control system according to claim 11, wherein said at least one defined position is one of a fully-closed position and a fully-open position.

13. A control system according to claim 11, wherein said electronic processor is further adapted to detect the engine idle state when an engine speed remains within a predetermined range for a determined time.

14. A control system according to claim 11, wherein said electronic processor is further adapted to identify an after-run state by that a key is turned off and that an engine is not running or cranking.

* * * * *